US 7,250,753 B2

(12) United States Patent
Terasaki

(10) Patent No.: US 7,250,753 B2
(45) Date of Patent: Jul. 31, 2007

(54) SENSOR ATTACHMENT MECHANISM FOR FLUID PRESSURE CYLINDER

(75) Inventor: Atsushi Terasaki, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 11/185,796

(22) Filed: Jul. 21, 2005

(65) Prior Publication Data

US 2006/0028202 A1    Feb. 9, 2006

(30) Foreign Application Priority Data

Aug. 9, 2004    (JP) .............................. 2004-232665

(51) Int. Cl.
*G01B 7/14* (2006.01)
*G01L 7/00* (2006.01)
*G01D 21/00* (2006.01)
*F01B 25/26* (2006.01)

(52) U.S. Cl. ........................... 324/207.24; 324/207.21; 324/207.26; 73/756; 73/866.5; 92/5 R; 91/1

(58) Field of Classification Search ........... 324/207.21, 324/207.24, 207.26; 92/5 R; 73/756, 866.5; 91/1, 361
See application file for complete search history.

(56) References Cited

U.S. PATENT DOCUMENTS 4,744,287 A *   5/1988   Miyamoto .................. 92/13.7

5,684,397 A *   11/1997  Ishishita ..................... 324/252
6,917,515 B2*   7/2005   Chen ........................... 361/679
2002/0100336 A1*   8/2002   Sakurai ..................... 73/866.5

FOREIGN PATENT DOCUMENTS

| DE | 7502826 | 8/1975 |
| GB | 1 534 304 | 11/1978 |
| JP | 09045974 A * | 2/1997 |
| JP | 2002349511 A * | 12/2002 |

* cited by examiner

*Primary Examiner*—Edward Lefkowitz
*Assistant Examiner*—David M. Schindler
(74) *Attorney, Agent, or Firm*—Oblon, Spivak, McClelland, Maier & Neustadt, P.C.

(57) ABSTRACT

Exemplary embodiments of the invention provide a sensor attachment mechanism capable of attaching a position detecting sensor having directivity in a proper direction to a fluid pressure cylinder having a rail extending along the length of a cylinder tube on the outer surface thereof. Embodiments include a position detecting sensor for sensing the operating position of a piston is attached with a sensor holder to a grooved rail extending along the length of a cylinder tube on the outer surface thereof. The position detecting sensor has directivity in magnetic detection. The sensor holder includes a base mounted on the rail and a sensor holding part extending from the base. The sensor holding part is close to or in contact with the surface of the cylinder tube outside rail walls. The sensor holding part has a holding guide for holding the position detecting sensor in a direction parallel to the axis line of the cylinder such that the directivity of the sensor in the magnetic detection is directed to substantially the center of the cylinder.

5 Claims, 5 Drawing Sheets

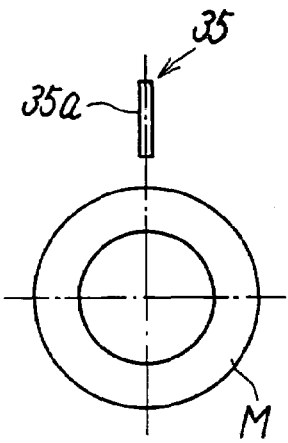
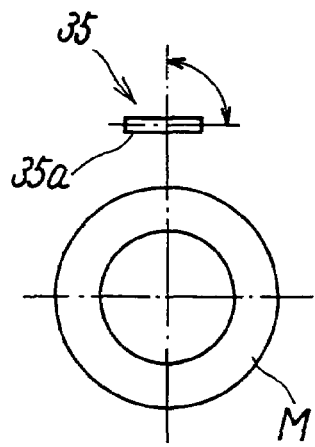
FIG. 9A  FIG. 9B
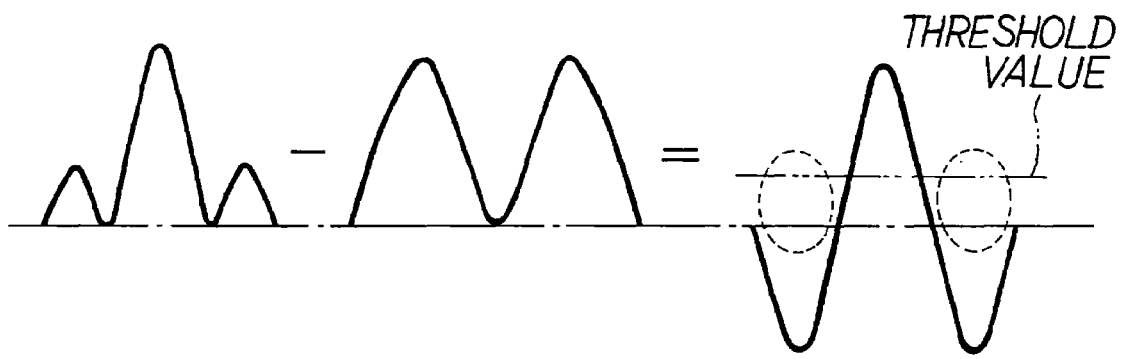
FIG. 10A
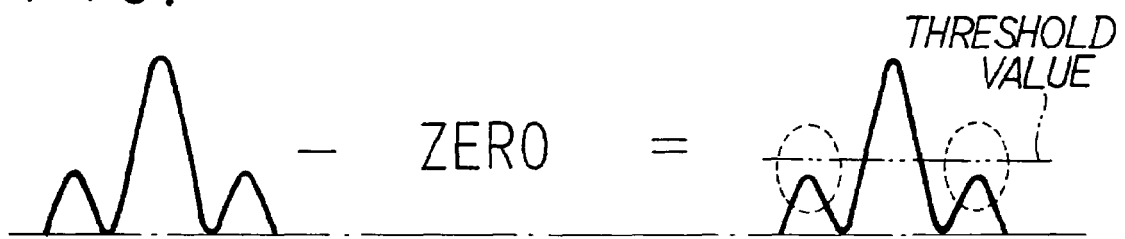
FIG. 10B

SENSOR ATTACHMENT MECHANISM FOR FLUID PRESSURE CYLINDER

TECHNICAL FIELD

The present invention relates to a sensor attachment mechanism for attaching a position detecting sensor to a fluid pressure cylinder having a rail disposed on the outer surface of a cylinder tube in the longitudinal direction.

BACKGROUND ART

A position detecting sensor is attached to a fluid pressure cylinder to determine the operating position of a piston. The position detecting sensor is provided outside the cylinder to correspond to a magnet attached to the piston in the cylinder.

According to the forms of fluid pressure cylinders, conventional mechanisms for attaching a position detecting sensor include a rail-type mechanism in which a position detecting sensor is attached with a sensor holder to a rail disposed on the outer surface of a cylinder tube in the longitudinal direction, a tie-rod-type mechanism in which a sensor holder is attached using tie rods connecting the end covers of a cylinder tube, and a groove-type mechanism in which a position detecting sensor is attached directly into a groove provided on the outer surface of a cylinder tube.

Of these mechanisms, the use of the tie-rod-type mechanism is limited to fluid pressure cylinders having tie rods. For the groove-type mechanism, a plurality of position detecting sensors cannot be provided to a single groove such that they approach each other to a distance of not more than the length of the sensors. Accordingly, a plurality of grooves must be provided on the outer surface of a cylinder tube to dispose the sensors in close proximity. For a fluid pressure cylinder, generally, position sensing at the ends of a stroke is often demanded. If the cylinder has a long stroke compared to the length of position detecting sensors, the sensors may be easily attached. If, on the other hand, the cylinder has a short stroke, the position detecting sensors interfere physically with each other in the groove mechanism. For a compact cylinder, particularly, position detecting sensors cannot be attached because the placement of grooves is spatially limited.

For the rail-type mechanism, a position detecting sensor is attached outside the rail walls of a rail. This mechanism is therefore advantageous in that a plurality of position detecting sensors may be disposed on a single rail in close proximity using the outer surfaces of the pair of rail walls by modifying the structure of a sensor holder.

In the rail-type mechanism, the position detecting sensors may be attached directly to the rail. In this case, however, general-purpose position detecting sensors cannot be used, and position detecting sensors must be prepared which have a special attachment structure and strength against, for example, tension from a lead.

The above types of position detecting sensors for sensing the position of a piston are typified by reed switch sensors, which open and close a contact using a magnetic force, and electronic magnetic sensors, which include a magnetoresistive element and have no electrical contact.

In recent years, electronic position detecting sensors have often been used for their long life and environmental compatibility. The magnetoresistive element used detects and converts the amount of change in magnetic force into an electrical signal, and the operating position of a piston is determined according to the detection output. Since the magnetoresistive element itself has directivity in magnetic detection, it must be attached such that the central axis line of the directivity is directed toward the center of a cylinder.

For the above rail-type sensor attachment mechanism, however, a position detecting sensor is positioned outside the rail walls of a rail. If, therefore, the position detecting sensor is attached in a direction parallel to the line between the centers of the rail and a cylinder, the central axis line of directivity of the position detecting sensor is not directed to the center of the cylinder. In particular, if the cylinder tube has a small diameter, the central axis line of the directivity deviates significantly from the line between the centers of the rail and the cylinder.

DISCLOSURE OF THE INVENTION

Problems to be Solved by the Invention

A technical object of the present invention is to provide a rail-type sensor attachment mechanism that is advantageous in disposing a plurality of position detecting sensors in close proximity and can hold a position detecting sensor having directivity in a proper direction.

Another technical object of the present invention is to provide a sensor attachment mechanism that enables the attachment of a general-purpose position detecting sensor to a rail with a sensor holder, that allows the sensor holder to protect the sensor from external forces, and that provides the reproducibility of attachment position and attitude in, for example, replacement with another position detecting sensor to maintain the proper detection position of the sensor and the proper direction of the directivity.

Means for Solving the Problems

To achieve the above objects, the present invention provides a sensor attachment mechanism wherein a position detecting sensor for sensing the operating position of a piston having a position detecting magnet is attached with a sensor holder to a grooved rail protruding from the outer surface of a cylinder tube along the length thereof. The position detecting sensor has directivity in magnetic detection. The sensor holder includes a base mounted on the rail and a sensor holding part extending from the base. The sensor holding part is close to or in contact with the surface of the cylinder tube outside a rail wall of the grooved rail. The sensor holding part has a holding guide for holding the position detecting sensor in a predetermined attitude in a direction parallel to the axis line of the cylinder. The attitude of the position detecting sensor held by the holding guide is such an attitude that the directivity of magnetic detection of the sensor is directed to substantially the center of the cylinder.

In the above sensor attachment mechanism, the central axis line of the directivity in magnetic detection of the position detecting sensor held by the sensor holding part is generally set at 15° to 75° from the line between the centers of the cylinder and the rail.

According to a preferred embodiment of the present invention, the holding guide, which is adjacent to the base, has a bolt hole through which a bolt is screwed to fix the position detecting sensor, and the sensor holding part has a groove member having a holding groove for holding the position detecting sensor. The groove member extends from the holding guide along the outer surface of the cylinder tube.

In addition, the grooved rail on the outer surface of the cylinder tube includes a pair of rail walls, each having a flange directed inward along the edge thereof, and the base of the sensor holder has a bolt hole through which an attachment bolt is screwed into a nut fitted in the grooved rail and a fit protrusion fitted between the flanges of the rail walls to fix the attachment attitude of the sensor holder with respect to the rail.

According to another preferred embodiment of the present invention, the sensor holder is mountable on the rail with the orientation of the sensor holder changed 180° around the central axis line of the bolt hole of the base mounted on the rail, and the bases of two sensor holders oriented 180° from each other are mountable on the rail with the sensor holding parts thereof brought alternately in contact with the longitudinal side surfaces of the rail.

Specifically, the position detecting sensor used in the sensor attachment mechanism according to the present invention may be a position detecting sensor having a magnetic detection part including a magnetoresistive element composed of a substrate having a patterned circuit that responds to a magnetic field in a direction parallel to the substrate and another patterned circuit that responds to a magnetic field in another direction parallel to the substrate. The directions parallel to the substrate are substantially perpendicular to each other. The magnetoresistive element outputs an electrical signal corresponding to a magnetic field detected according to the difference between components detected across the patterned circuits. The magnetic detection part is incorporated in the position detecting sensor with either of the directions parallel to the substrate as the direction of the directivity in magnetic detection.

According to the sensor attachment mechanism having the above structure, the sensor holding part of the sensor holder has the holding guide for holding the position detecting sensor in a predetermined attitude in a direction parallel to the axis line of the cylinder. The predetermined attitude of the position detecting sensor held by the holding guide is such an attitude that the directivity in magnetic detection of the sensor is directed to substantially the center of the cylinder. The position detecting sensor, therefore, can always be attached in a proper attitude only by attaching the position detecting sensor to the holding guide. For a compact or short-stroke fluid pressure cylinder, particularly, magnetic members, such as a fixing member and a bolt arranged around the cylinder can vary the distribution of magnetic flux from a magnet incorporated in the cylinder which causes the position detecting sensor to operate. The above sensor attachment mechanism can minimize such an effect to allow for stable position sensing.

In the above sensor attachment mechanism according to the present invention, additionally, the position detecting sensor is attached with the sensor holder to the rail on the fluid pressure cylinder. This allows the use of general-purpose position detecting sensors. In addition, a modification to the shape of the position detecting sensor, for example, may be supported by changing the shape of the sensor holder without modifying the cylinder itself.

Furthermore, the sensor holder can protect the position detecting sensor from external forces and achieve the reproducibility of attachment position and attitude in, for example, replacement with another position detecting sensor to maintain the proper detection position of the sensor and the proper direction of the directivity.

In the holding guide of the sensor holding part of the sensor holder, even if the attitude of the sensor is set such that it is suited to a fluid pressure cylinder with a certain diameter, the attitude of the sensor is not necessarily suitable for fluid pressure cylinders with different diameters. If, therefore, the sensor attachment mechanism according to the present invention is applied to fluid pressure cylinders with various diameters, sensor holders with different sensor attachment attitudes must be prepared according to the diameters of the fluid pressure cylinders.

Advantages

The above sensor attachment mechanism according to the present invention is a rail-type mechanism, which is advantageous in disposing a plurality of position detecting sensors in close proximity, and can hold a position detecting sensor having directivity in a proper direction.

BRIEF DESCRIPTION OF THE DRAWINGS

FIG. 9(A) is a diagram illustrating the placement of a substrate of the position detecting sensor in a straight line drawn radially from the center of a magnet, and FIG. 9(B) is a diagram illustrating the placement of the substrate of the position detecting sensor in a direction perpendicular to the straight line.

FIG. 10(A) is a diagram showing the output of the position detecting sensor for the placement of the substrate in FIG. 9(A), and FIG. 10(B) is a diagram showing the output of the position detecting sensor for the placement of the substrate in FIG. 9(B).

BEST MODE FOR CARRYING OUT THE INVENTION

FIGS. 1 to 4 illustrate a sensor attachment mechanism according to an embodiment of the present invention.

Figure 1:
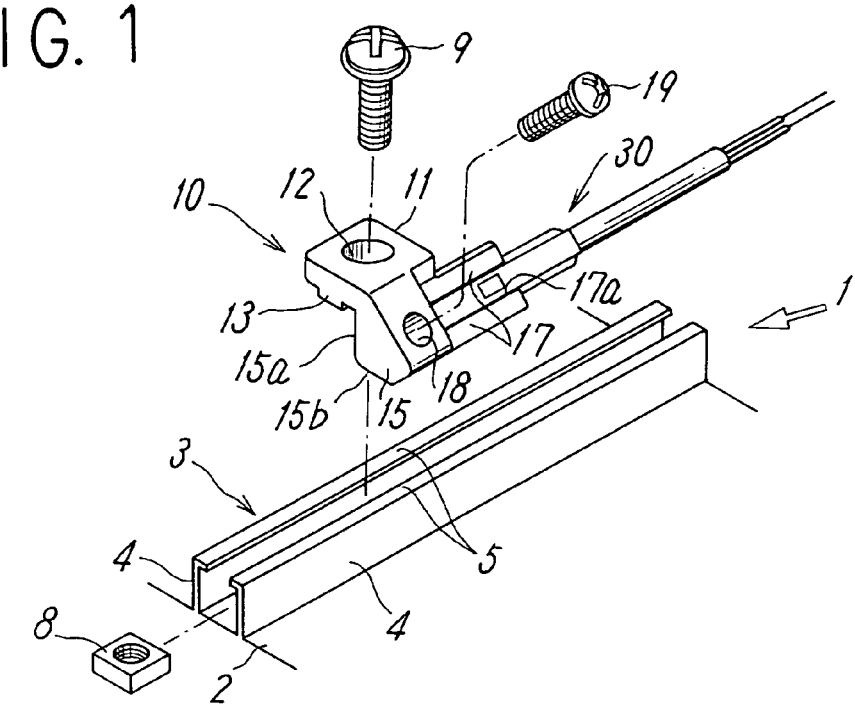
FIG. 1 is an exploded perspective view of a sensor attachment mechanism according to an embodiment of the present invention.
Figure 2:
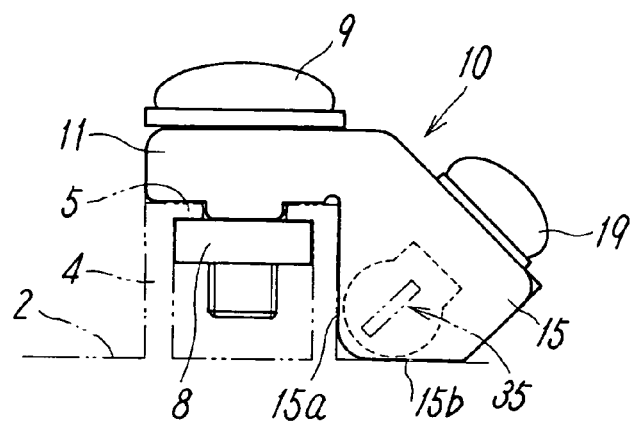
FIG. 2 is an end view of an attached sensor holder according to the embodiment.
Figure 4:
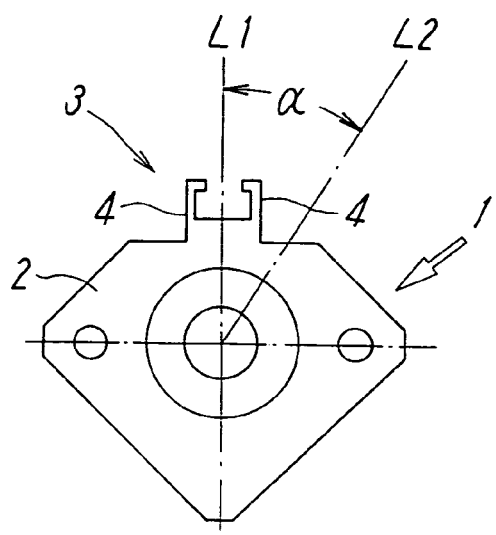
FIG. 4 is a diagram illustrating the directivity of the position detecting sensor.

Referring to, for example, FIGS. 1, 2, and 4, a fluid pressure cylinder 1 provided with a position sensing switch according to the present invention has a grooved rail 3 protruding from the outer surface of a cylinder tube 2 along the length thereof. A position detecting sensor 30 is attached to the rail 3 with a sensor holder 10. This position detecting sensor 30 has directivity in sensing the operating position of a piston having a position detecting magnet (not shown in the drawings). The position detecting magnet is a ring-shaped magnet that is fitted around the piston of the fluid pressure cylinder 1 and is magnetized such that the magnetic flux therefrom is directed in the axial direction of the cylinder 1.

The cylinder tube 2 is made of a nonmagnetic material such as aluminum, and the grooved rail 3 is formed integrally with the outer surface of the cylinder tube 2. The grooved rail 3 includes a pair of rail walls 4, each having a flange 5 directed inward along the edge thereof. A nut 8 for mounting the sensor holder 10 is fitted into the grooved rail 3 so as not to escape from between the flanges 5.

The sensor holder 10 is formed by molding, for example, a synthetic resin. The sensor holder 10 includes a base 11 mounted on the rail 3 of the fluid pressure cylinder 1 and a sensor holding part 15 extending from the base 11. The sensor holding part 15 is close to or in contact with the surface of the cylinder tube 2 outside the rail walls 4 of the grooved rail 3.

The base 11 has a bolt hole 12 and a fit protrusion 13. An attachment bolt 9 is screwed through the bolt hole 12 into the nut 8 fitted in the grooved rail 3 on the outer surface of the cylinder tube 2. The fit protrusion 13 is fitted between the flanges 5 of the rail walls 4 to fix the attachment attitude of the sensor holder 10 with respect to the rail 3. The rail 3 is formed such that the center line thereof is directed to the center of the fluid pressure cylinder 1. Accordingly, the attachment bolt 9 is provided such that the central axis line thereof is directed to the center of the fluid pressure cylinder 1.

The sensor holding part 15 holds the position detecting sensor 30. The sensor holding part 15 has a rail contact wall 15a and a bottom wall 15b. When the base 11 is mounted on the rail 3, the rail contact wall 15a is in contact with either of the outer surfaces of the rail walls 4, and the bottom wall 15b is in contact with the outer surface of the cylinder tube 2. The sensor holding part 15 has a holding guide 16 and a groove member 17. The holding guide 16 is provided inside the sensor holding part 15 and is adjacent to the base 11, and the head of the position detecting sensor 30 is fitted into the holding guide 16. The groove member 17 has a holding groove 17a extending from the holding guide 16 along the outer surface of the cylinder tube 2 to hold the position detecting sensor 30.

The sensor holding part 15 and the groove member 17 provided thereto are effective for protecting the position detecting sensor 30 if externals forces act on, for example, a lead of the position detecting sensor 30. The sensor holding part 15 and the groove member 17 must be provided so as not to cover an operation indicator light (LED) 33 of the position detecting sensor 30, as described later.

The holding guide 16 is defined by a recess suited to the shape of the position detecting sensor 30, which is noncircular in cross-section, so that the head of the position detecting sensor 30 is fitted to the recess. The holding guide 16 can hold the position detecting sensor 30 in a predetermined attitude in a direction parallel to the axis line of the fluid pressure cylinder 1.

In addition, the sensor holding part 15 has a bolt hole 18 through which a bolt 19 is screwed into a screw part 34 of the position detecting sensor 30 held by the holding guide 16 to fix the sensor 30 in a predetermined attitude. This bolt hole 18 is a simple hole with no female screw thread.

The predetermined attitude of the position detecting sensor 30 held by the holding guide 16 is such an attitude that the directivity in magnetic detection of the sensor 30 is directed to substantially the center of the fluid pressure cylinder 1. This attitude may be achieved by fitting the position detecting sensor 30, which is noncircular in cross-section, to the holding guide 16, or by screwing the bolt 19 into the screw part 34 of the position detecting sensor 30 through the bolt hole 18 of the sensor holding part 15.

In the holding guide 16 of the sensor holding part 15, even if the attitude of the position detecting sensor 30 is set such that it is suited to a fluid pressure cylinder with a certain diameter, the attitude of the sensor 30 is not necessarily suitable for fluid pressure cylinders with different diameters. If, therefore, the sensor attachment mechanism according to the present invention is applied to fluid pressure cylinders with various diameters, sensor holders with different sensor attachment attitudes must be prepared according to the diameters of the fluid pressure cylinders. In this case, the diameters of practical fluid pressure cylinders fall within a given range. Referring to FIG. 4, therefore, the angle a between the lines L1 and L2 is generally set within a range of 15° to 75°. The line L1 is the line between the centers of the cylinder 1 and the rail 3. The line L2 is the central axis line of the directivity in magnetic detection of the position detecting sensor 30 held by the sensor holding part 15.

Accordingly, if the sensor holder 10 is mounted on the rail 3 with the central axis line L2 inclined properly according to the diameter of the fluid pressure cylinder 1, the sensor holder 10 can provide the reproducibility of attachment position and attitude in, for example, replacement with another position detecting sensor to maintain the proper detection position of the sensor and the proper direction of the directivity.

Figure 5:
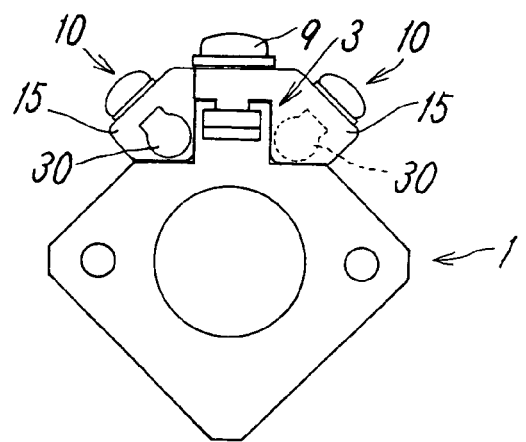
FIG. 5 is a diagram illustrating the attachment of two sensor holders.

Referring to FIG. 5, the sensor holder 10 having the above structure is mountable on the rail 3 with the orientation of the sensor holder 10 changed 180° around the central axis line (L1) of the bolt hole 12 of the base 11 mounted on the rail 3, that is, with the fit protrusion 13 of the base 11 oppositely oriented. The longitudinal side surfaces of the rail 3, with the base 11 mounted thereon, are formed flat so that the bases 11 of the two sensor holders 10 with the orientation thereof changed 180° are mountable on the rail 3 with both end surfaces of the rail 3 in the longitudinal direction thereof brought alternately in contact with the base 11. If a magnetoresistive element 35 for detecting magnetic force is separated from the sensor holding part 15, as shown in FIG. 3, two sensors may be provided in any positional relationship.

Next, the structure and directivity of the position detecting sensor 30 are described below with reference to FIGS. 3 and 6 to 10.

Figure 3:
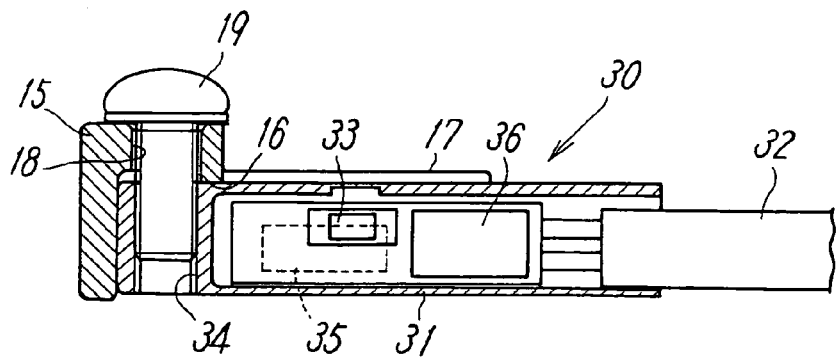
FIG. 3 is a longitudinal sectional view of the sensor holder according to the embodiment, taken along the axis line of a position detecting sensor.
Figure 6:
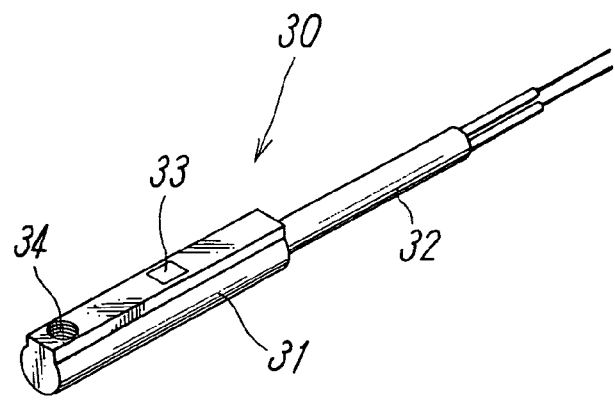
FIG. 6 is a perspective view of the position detecting sensor.

Referring to FIGS. 3 and 6, the position detecting sensor 30 includes a sensor body 31, the screw part 34, a lead 32, and the operation indicator light 33. The sensor body 31 is noncircular in cross-section. The screw part 34 is provided at the leading end of the sensor body 31, and the bolt 19 is screwed thereinto. The lead 32 connects to the other end of the sensor body 31 to externally output detection signals from the sensor 30. The operation indicator light 33 is disposed on the top surface of the middle part. The position detecting sensor 30 contains a magnetic detection part including the magnetoresistive element 35 and a main switch circuit 36 for processing signals from the magnetoresistive element 35. These components are incorporated in the sensor body 31 by resin molding.

Figure 7:
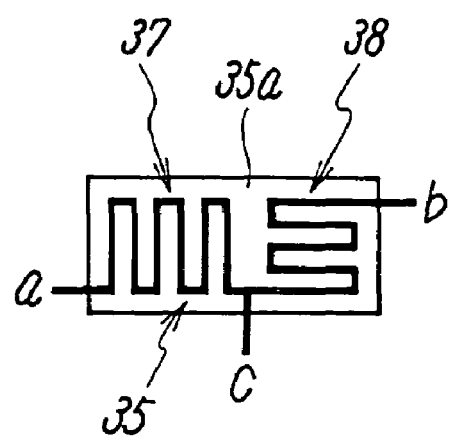
FIG. 7 is a diagram illustrating the circuit pattern of a magnetoresistive element.
Figure 8A:
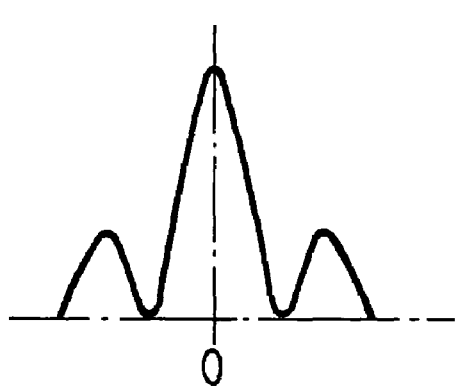
FIG. 8(A) is a graph showing the output of a component detected in the longitudinal direction of the magnetoresistive element.
Figure 8B:
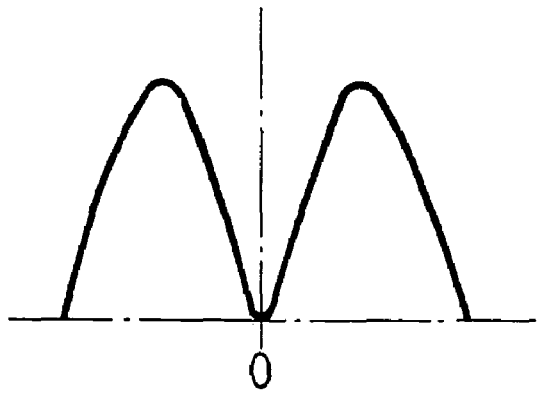
FIG. 8(B) is a graph showing the output of a component detected in the lateral direction of the magnetoresistive element.
Figure 11:
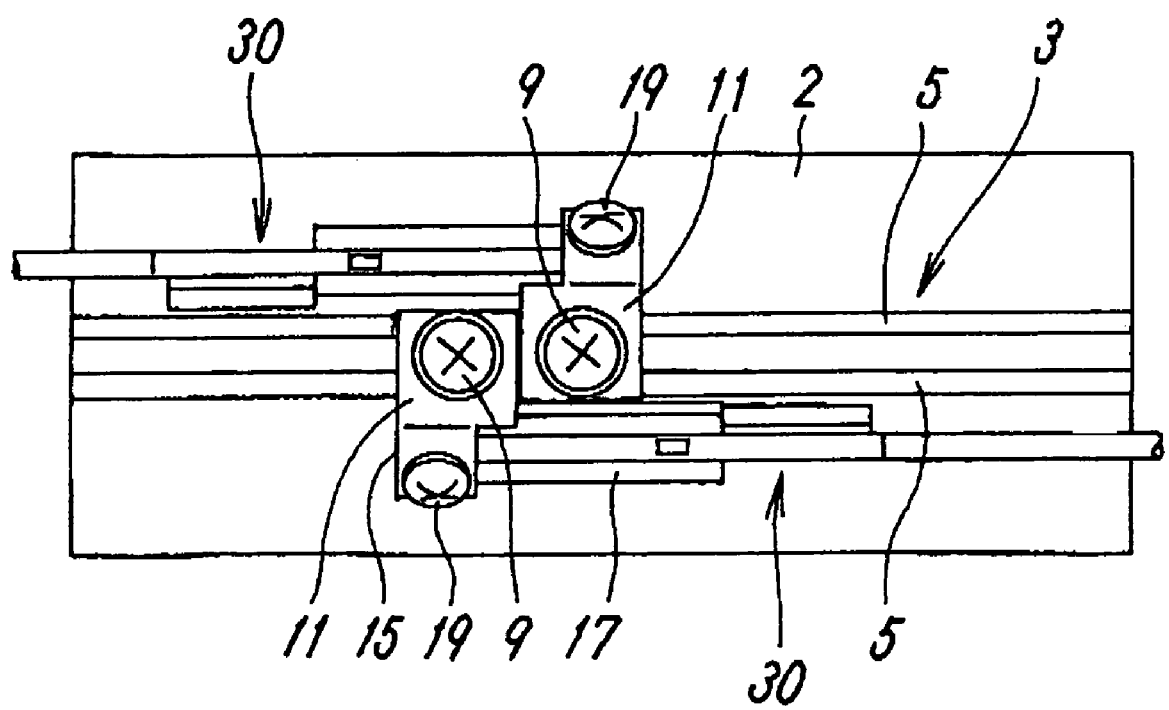
FIG. 11 is a diagram showing a plane view of the embodiment of FIG. 5.

Referring to FIG. 7, the magnetoresistive element 35 is composed of a substrate 35a having a patterned circuit 37 that responds to a magnetic field in the longitudinal direction and another patterned circuit 38 that responds to a magnetic field in the lateral direction. In position detecting, the neutral voltage across terminals a and c and terminals b and c is input to a determination circuit of the main switch circuit 36. The magnetoresistive element 35 outputs an electrical signal corresponding to a magnetic force detected according to the difference between components detected across the terminals. FIGS. 8(A) and 8(B) show the magnitude distribution of the vector of a magnetic field from the magnet provided around the piston in the stroke direction of the magnet. FIG. 8(A) shows the component detected in the longitudinal direction. FIG. 8(B) shows the component detected in the lateral direction. In FIG. 8(A), a peak appears at the center 0 of the magnet. In FIG. 8(B), peaks appear in the vicinities of the pole faces of the magnet and becomes substantially zero at the center 0 of the magnet. In FIGS. 8(A) and 8(B), the horizontal axis represents displacement, and the vertical axis represents output.

If the substrate 35a of the magnetoresistive element 35 is disposed in a straight line drawn radially from the center of a magnet M as shown in FIG. 9(A), the output of the position detecting sensor 30 is determined as the difference between the detected components in FIGS. 8(A) and 8(B), as shown in the right of FIG. 10(A). The unnecessary peaks on the sides of the peak in FIG. 8(A) are cancelled (see the areas circled with broken lines), so that the magnetoresistive element 35 has low possibility of malfunction. If, on the other hand, the substrate 35a is disposed as shown in FIG. 9(B), the component in the lateral direction in FIG. 8(B) is not detected. As shown in FIG. 10(B), therefore, the output of the position detecting sensor 30 leaves unnecessary peaks approaching a threshold level on the sides of the main peak (see the areas circled with broken lines). Because these peaks vary slightly by, for example, peripheral magnetic members, malfunctions occur more easily.

Thus, the detected magnetic components of the magnetoresistive element 35 vary with the angle ($\alpha$ in FIG. 4) of the substrate 35a. The state of the substrate 35a shown in FIG. 9(A), namely, the lateral direction, in which the patterned circuit 38 responds to a magnetic field, is the direction of the directivity in magnetic detection. The substrate 35a is incorporated in the sensor body 31 such that the directivity is directed to substantially the center of the fluid pressure cylinder 1. This enables the most stable operation of the position detecting sensor 30.

The invention claimed is:

1. A sensor attachment mechanism for a fluid pressure cylinder, wherein
    a position detecting sensor for sensing an operating position of a piston having a position detecting magnet is attached with a sensor holder to a grooved rail protruding from an outer surface of a cylinder tube along a length thereof, the position detecting sensor configured to detect the magnet;
    the sensor holder comprises a base mounted on the rail and a sensor holding part extending from the base, the sensor holding part being close to or in contact with a surface of the cylinder tube outside a rail wall of the grooved rail;
    the sensor holding part has a holding guide for holding the position detecting sensor in a predetermined attitude in a direction parallel to an axis line of the cylinder;
    the attitude of the position detecting sensor held by the holding guide is such that the position detecting sensor is directed to substantially a center of the fluid pressure cylinder to detect the magnet;
    the grooved rail on the outer surface of the cylinder tube includes a pair of parallel rail walls, each having a flange directed inward along an edge thereof; and
    the base of the sensor holder has a bolt hole through which an attachment bolt is screwed into a nut fitted in between the parallel rail walls and a fit protrusion fitted between the flanges of the rail walls to fix an attachment attitude of the sensor holder with respect to the rail.

2. The sensor attachment mechanism for a fluid pressure cylinder according to claim 1, wherein
    the holding guide, which is adjacent to the base, has a bolt hole through which a bolt is screwed to fix the position detecting sensor; and
    the sensor holding part has a groove member having a holding groove for holding the position detecting sensor, the groove member extending from the holding guide along the outer surface of the cylinder tube.

3. The sensor attachment mechanism for a fluid pressure cylinder according to claim 1, wherein
    the sensor holder is mountable on the rail with the orientation of the sensor holder changed 180° around the central axis line of the bolt hole of the base mounted on the rail; and
    bases of two sensor holders oriented 180° from each other are mountable on the rail with the sensor holding parts thereof brought into contact with the longitudinal side surfaces of the rail.

4. The sensor attachment mechanism for a fluid pressure cylinder according to claim 1, wherein a central axis line of directivity in magnetic detection of the position detecting sensor held by the sensor holding part is set at 15° to 75° from the line between centers of the cylinder and the rail.

5. The sensor attachment mechanism for a fluid pressure cylinder according to claim 1, wherein
    the position detecting sensor has a magnetic detection part including a magnetoresistive element comprising a substrate having a patterned circuit that responds to a magnetic field in a direction parallel to the substrate and another patterned circuit that responds to a magnetic field in another direction parallel to the substrate, the directions parallel to the substrate being substantially perpendicular to each other;
    the magnetoresistive element outputs an electrical signal corresponding to a magnetic field detected according to the difference between components detected across the patterned circuits; and
    the magnetic detection part is incorporated in the position detecting sensor with either of the directions parallel to the substrate as the direction of directivity in magnetic detection.

* * * * *